United States Patent [19]

Ensinger et al.

[11] Patent Number: 4,460,922

[45] Date of Patent: Jul. 17, 1984

[54] MEMORY SELECT SYSTEM FOR AN STV DECODER

[75] Inventors: James W. Ensinger, Roselle; Melvin C. Hendrickson, Elmhurst, both of Ill.

[73] Assignee: Zenith Electronics Corporation, Glenview, Ill.

[21] Appl. No.: 322,481

[22] Filed: Nov. 18, 1981

[51] Int. Cl.³ .......................... H04N 7/16; H04K 1/04
[52] U.S. Cl. .................................. 358/122; 358/114; 358/123
[58] Field of Search .......................... 358/114, 122, 123

[56] References Cited

U.S. PATENT DOCUMENTS

| | | | |
|---|---|---|---|
| 4,068,264 | 1/1978 | Pires | 358/123 |
| 4,115,807 | 9/1978 | Pires | 358/122 |
| 4,225,884 | 9/1980 | Block et al. | 358/122 |
| 4,292,650 | 9/1981 | Hendrickson | 358/123 |
| 4,369,462 | 1/1983 | Tomizawa et al. | 358/123 |

Primary Examiner—S. C. Buczinski

[57] ABSTRACT

A subscription television system includes means broadcasting a scrambled television signal encoded with p-bit program and subscriber authorization codes and m-bit memory write and read codes. Each subscriber is provided with a decoder having ($2^m$) p-bit memory locations, the decoder being operable for storing a broadcast p-bit subscriber authorization code in a memory location defined by the broadcast m-bit memory write code for updating the decode authorization status of the subscriber and being operable for comparing a broadcast program code with a subscriber authorization code stored in a memory location defined by the broadcast m-bit memory read code for developing a decode authorization signal to effect unscrambling of the broadcast television signal.

11 Claims, 4 Drawing Figures

MEMORY SELECT SYSTEM FOR AN STV DECODER

BACKGROUND OF THE INVENTION

The present invention relates generally to improvements in subscription television systems and, more particularly, to an improved technique for increasing the number of programming levels or tiers characterizing the system without significantly reducing the subscriber population base.

In subscription television systems television programming signals are transmitted, either "over-the-air" or through a suitable cable network, in a scrambled form, which signals may be unscrambled for viewing by suitable decoder operating in association with the television receiver of an authorized system subscriber. The broadcast television signals are typically grouped into a number of levels or tiers each representing a different program category such as sporting events, movies, news, etc., with the decoder of a particular subscriber being authorized for unscrambling the televised program signals in selected categories paid for by the subscriber. The broadcast program signals in the remaining unselected and therefore unauthorized categories are coupled to the subscriber's television receiver in a scrambled and unviewable form. Of course, in a subscription television system of this type, all of the broadcast program signals will be reproduced in a scrambled and unviewable form by a normal television receiver, i.e. a television receiver not operating in association with a suitable decoder.

In a tiered subscription television system as described above, each system subscriber may selectively subscribe to one or more of the programming tiers as his or her interests dictate. To this end, each decoder, which is uniquely identified by a stored subscriber address code, includes a subscriber authorization memory storing a subscriber authorization code identifying the programming tiers which the particular subscriber is authorized to decode. The stored subscriber authorization code is compared to a program code typically transmitted during a selected horizontal line of the vertical intervals of the broadcast television signal, the program code identifying the programming level or tier of the accompanying television signal. If the stored subscriber authorization code and the broadcast program code result in a favorable comparison, suitable decode authorization signals are developed in the decoder enabling the received television signal to be decoded and coupled to the subscriber's television receiver for viewing. On the other hand, if a proper match between the subscriber authorization code and the transmitted program code is not detected, indicating that the subscriber is not authorized to decode television signals in the programming tier identified by the broadcast program code, the decode authorization signals are not developed and the received television signal is not unscrambled by the decoder.

From time to time, it is necessary to update or refresh the stored subscriber authorization codes to reflect changes in the programming status of the subscribers, to completely de-authorize delinquent subscribers or, for example, to selectively authorize the decoding of special event or premium programs. Such updating or refreshing operations are typically accomplished by sequentially addressing the system decoders for entering the updated subscriber authorization codes in memory. That is, for example, each subscriber address code together with an associated updated subscriber authorization code may be transmitted in sequence during respective horizontal lines of the vertical intervals of the broadcast television signal such that each system decoder may be individually addressed for entering a desired subscriber authorization code in memory.

In order to provide for an adequate subscriber population base it has been found desirable to use a 20-bit subscriber address code allowing somewhat more than one million subscribers to be accomodated by the system. Since a horizontal scanning line can accomodate up to about 26 bits of information, each such line can be used to transmit a 5-bit subscriber authorization code together with the 20-bit subscriber address code. This allows for a 5 tier system (i.e. 5 programming categories) with each bit of the subscriber authorization code being used to reflect whether a particular subscriber is or is not authorized to decode television signals belonging to a respective programming category.

In many applications, however, it is desired to provide substantially more than 5 programming tiers, a 20 tier system, for example, often being desired. Additional programming tiers may be effected by increasing the bit-length of the subscriber authorization codes but this suffers from the disadvantage that the bit-length of the subscriber address codes must be reduced by a corresponding amount thereby reducing the subscriber population base which may be accomodated by the system. In particular, where it is desired to increase the number of programming tiers four-fold as described in the foregoing example, the necessary reduction in the subscriber population base is totally unacceptable.

It is therefore a basic object of the present invention to provide an improved subscription television system and a decoder for use therewith.

It is a more specific object of the invention to provide a subscription television system and a decoder for use therewith where an increased number of programming tiers may be accomodated without significantly reducing the subscriber population base.

BRIEF DESCRIPTION OF THE DRAWINGS

The features of this invention which are believed to be novel are set forth with particularity in the appended claims. The invention, together with its objects and advantages thereof, may best be understood by reference to the following description taken in conjunction with the accompanying drawings in which:

DESCRIPTION OF THE PREFERRED EMBODIMENT

Figure 1:
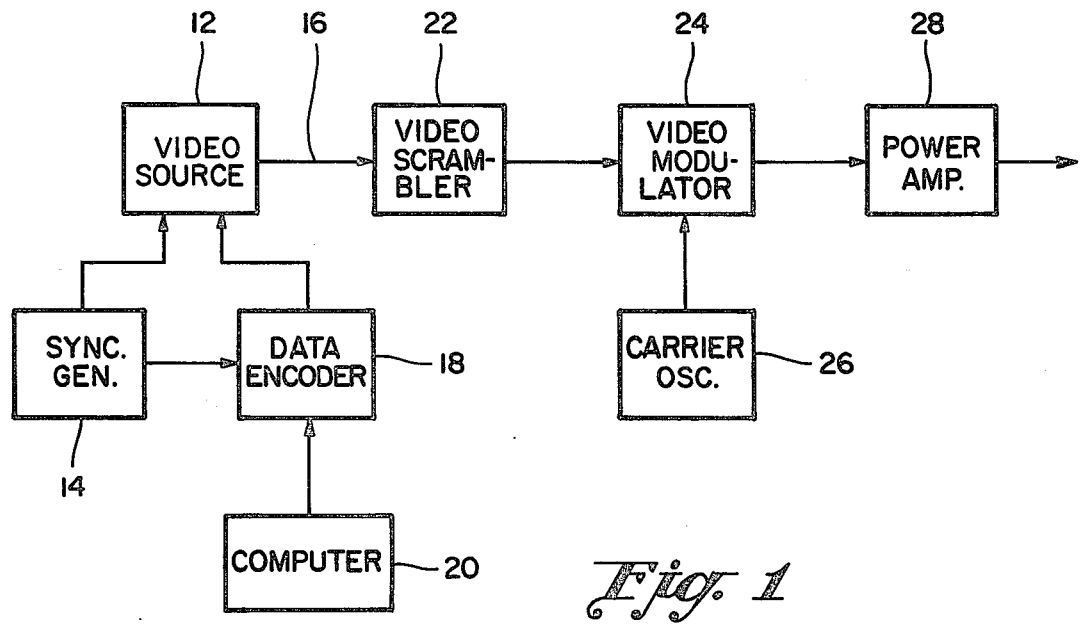
FIG. 1 is a general block diagram showing the video portion of a subscription television signal transmitter.

Referring now to the drawings and, in particular, to FIG. 1, there is shown a conventional subscription television signal transmitter adapted for transmitting subscription television signals for use in either an "overthe-air" pay television system or in a cable television system. The transmitter comprises a video channel, the associated audio channel not being shown, which includes a normal video signal source 12 responsive to a sync generator 14 for developing a conventional baseband video signal on an output conductor 16. Video signal source 12 also receives an input from a data encoder 18 which develops an appropriately band-limited digitally encoded serial data signal for insertion in one or more unused horizontal lines of the vertical blanking interval of the composite video signal developed on conductor 16. The digitally encoded signal is typically generated by data encoder 18 in response to data signals supplied by a computer 20, the computer being operated by the broadcaster for transmitting selected subscriber and program data enabling control over the entire subscription television system.

Figure 2:
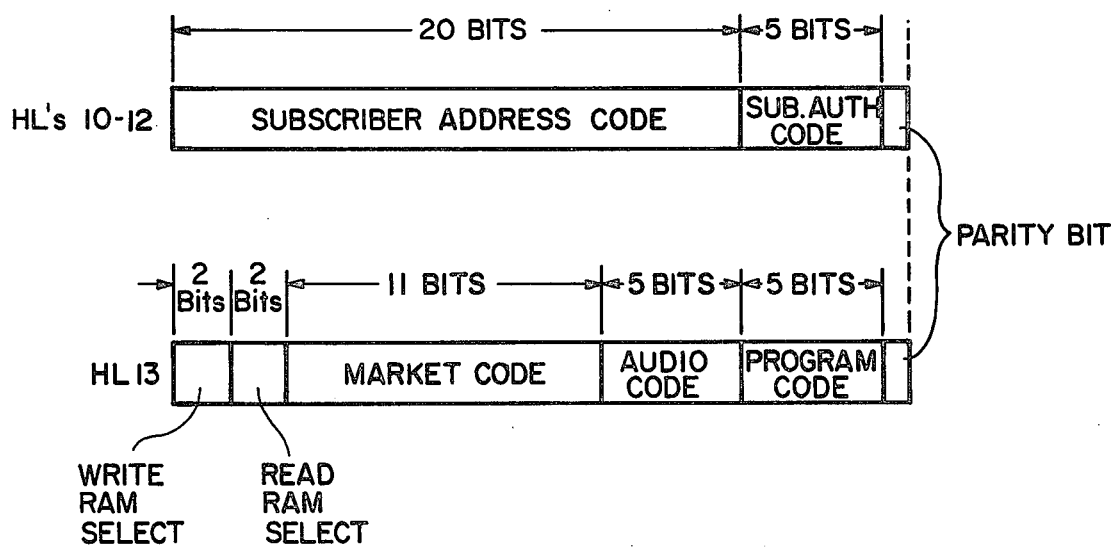
FIG. 2 graphically illustrates the format of the data encoded into several horizontal scanning lines of the vertical intervals of the television signal produced by the transmitter of FIG. 1.

While the transmitted subscriber and program data may take various forms, a specific exemplary format is illustrated in FIG. 2. In this exemplary format, horizontal scanning lines 10 through 13 of the vertical intervals of the baseband video signal developed on conductor 16 are each used to transmit 26 bits of information. The first 20 bits of each of horizontal lines 10 through 12 are reserved for the transmission of a subscriber address code which identifies a particular system subscriber and his associated decoder. A 5-bit subscriber authorization code is then transmitted after each subscriber address code followed by a single parity bit. The subscriber authorization code, as will be explained in further detail hereinafter, is used to selectively set the decode authorization status of the subscriber identified by the subscriber address code transmitted during the same horizontal scanning line. Therefore, the decode authorization status of three different subscribers may be selectively set during each field of the video signal developed on conductor 16. Horizontal scanning line 13 is used to transmit a number of control codes including a 2-bit write RAM select code, a 2-bit read RAM select code, an 11-bit market code, a 5-bit audio code and a 5-bit program code. The audio and market codes not being pertinent to the present invention will not be discussed in further detail herein. The write and read RAM select codes direct the operation of the subscriber's decoder memories and will be discussed further below. The 5-bit program code is used to transmit encoded data identifying the program category or tier of the accompanying television signal.

More specifically, at any given time, each bit of the broadcast program code represents a respective programming category, a logic 1 state bit indicating that the broadcast program belongs to the category represented by the respective bit and a logic 0 state bit indicating that the broadcast program does not belong to the category represented by the respective bit. Each bit of a stored subscriber authorization code represents the subscriber's decode authorization status with respect to a particular programming category, a logic 1 state bit indicating that the subscriber is authorized to decode broadcast programs belonging to the respective category and a logic 0 state bit indicating that the subscriber is not authorized to decode broadcast programs belonging to the respective category. Therefore, a subscriber's authority to decode any particular broadcast may be conveniently determined by comparing the logic 1 state bit of the broadcast program code with the stored subscriber authorization code bit representing the same programming category. If this bit is also logic 1 the subscriber is authorized to decode the broadcast program and otherwise he is not.

Returning to FIG. 1, the composite baseband video signal developed on conductor 16, together with the subscriber and program data encoded in the vertical intervals thereof, is applied to a video scrambler 22. While various scrambling techniques may be used, in an exemplary embodiment of the invention, video scrambler 22 is adapted for modifying a standard NTSC television signal by suppressing the amplitude of randomly selected horizontal blanking and synchronization pulses during the fields of the video signal. As a result of this signal suppression, the horizontal deflection system of a normal television receiver will lock on random video peaks during the active or video trace line portions of the video signal rather than on the actual horizontal synchronization pulses resulting in the production of a scrambled video image on the viewing screen of a normal television receiver. In addition, the ability of the television receiver to use the color reference burst associated with the horizontal synchronization signals is severely degraded causing inaccurate color reproduction. The encoded and scrambled baseband video signal is coupled from video scrambler 22 to a video modulator 24 for amplitude modulating an RF carrier signal developed by a carrier oscillator 26, the resulting amplitude modulated signal being amplified by a power amplifier 28 before transmission.

Figure 3:
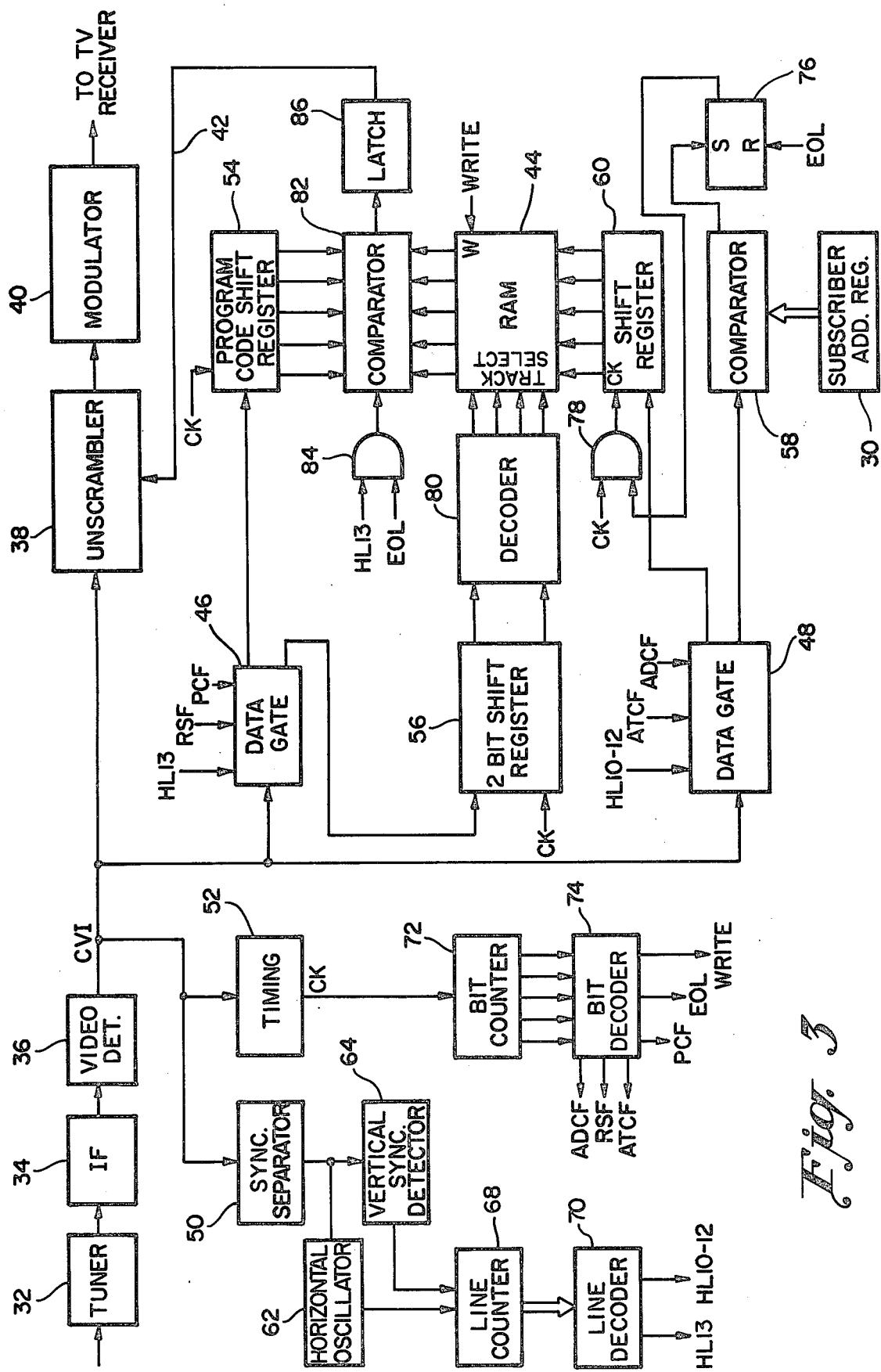
FIG. 3 is a block diagram illustrating a decoder operable for unscrambling the television signal produced by the transmitter of FIG. 1.

Each system subscriber is supplied with a decoder, see FIG. 3, identified by a unique subscriber address code stored in a subscriber address register 30. The decoder comprises means for receiving and coupling the broadcast RF television signal to a conventional television receiver tuning stage 32. As is well known in the art, tuner 12 converts the received RF television signal to an intermediate frequency signal which is coupled through an intermediate frequency amplifier 34 to the input of a video detector 36. The output of video detector 36 comprises a composite baseband video signal corresponding to the baseband signal developed at the output of video scrambler 22 of the transmitter shown in FIG. 1. This scrambled baseband video signal is coupled through an unscrambler 38, amplitude modulated by a standard RF television carrier (typically a channel 3 or channel 4 carrier) in a modulator 40 and coupled therefrom to the antenna terminals of the subscriber's television receiver for viewing. Unscrambler 38 is selectively enabled in response to a decode authorization signal developed on a line 42. When enabled, the unscrambler is effective for reversing the scrambling process so that an unscrambled standard NTSC composite baseband video signal is developed at its output facilitating viewing of the transmitted television signal by the subscriber. Otherwise, i.e. if unscrambler 38 is not enabled, the video signal will not be unscrambled making viewing thereof by the subscriber quite difficult if not altogether impossible.

The decoder illustrated in FIG. 3 includes a control memory embodied in the form of a RAM 44 which includes four 5-bit memory locations. Each of four different 5-bit subscriber authorization codes may therefore be stored at a respective memory location of RAM 44, the memory location storing any particular subscriber authorization code being determined by the write RAM select code transmitted during the same video field. Since each 5-bit subscriber authorization code represents five different programming categories or tiers, i.e. the state of each represents whether the subscriber is authorized to decode broadcast television signals belonging to a respective category or tier, 20 different programming tiers may be accommodated by RAM 44. The broadcast program code, together with the associated read RAM select code, is used to establish the programming tier or tiers to which the broadcast television signal belongs. That is, the state of each bit of the program code represents one of four different programming tiers, the particular one of which is defined by the state of the 2-bit read RAM select code. Therefore, in order to detect whether the subscriber is authorized to decode a broadcast television signal, each bit of the broadcast code is compared with the corresponding bit of the subscriber authorization code stored at the memory location defined by the broadcast read RAM select code. If a condition of equality is detected between the states of the bit of the program code identifying the broadcast television signal and the corresponding bit of the subscriber authorization code then unscrambler 38 is enabled for unscrambling the broadcast television signal, unscrambler 38 otherwise being maintained in a disabled condition. In this manner, a 20 tier system is provided using 5-bit program and subscriber authorization codes and without reducing the subscriber population base.

With more detailed reference to FIG. 3, the composite baseband video signal developed at the output of video detector 36 is coupled to the inputs of a pair of data gates 46 and 48, a sync separator 50 and a timing circuit 52. Data gate 46 is responsive to a plurality of input control signals for gating the broadcast program code to the serial data input of a 5-bit program code shift register 54 and for gating the write and read RAM select codes to the serial data input of a 2-bit shift register 56. Data gate 48 is responsive to a plurality of input control signals for gating each subscriber address code to one input of a comparator 58 with the associated subscriber authorization code being gated to the serial data input of a 5-bit shift register 60.

Sync separator 50 extracts the synchronizing components from the composite baseband video signal developed at the output of video detector 36 for application to a horizontal oscillator 62 and a vertical sync detector 64. The horizontal rate signal developed at the output of horizontal oscillator 62 and the vertical rate signal developed at the output of vertical sync detector 64 are applied to the input of a line counter 68. The output of line counter 68 is, in turn, supplied to a line decoder 70 which develops a first output control signal identifying or framing each occuring horizontal line 13 and a second output control signal identifying or framing each occuring horizontal line 10 through 12.

Figure 4:
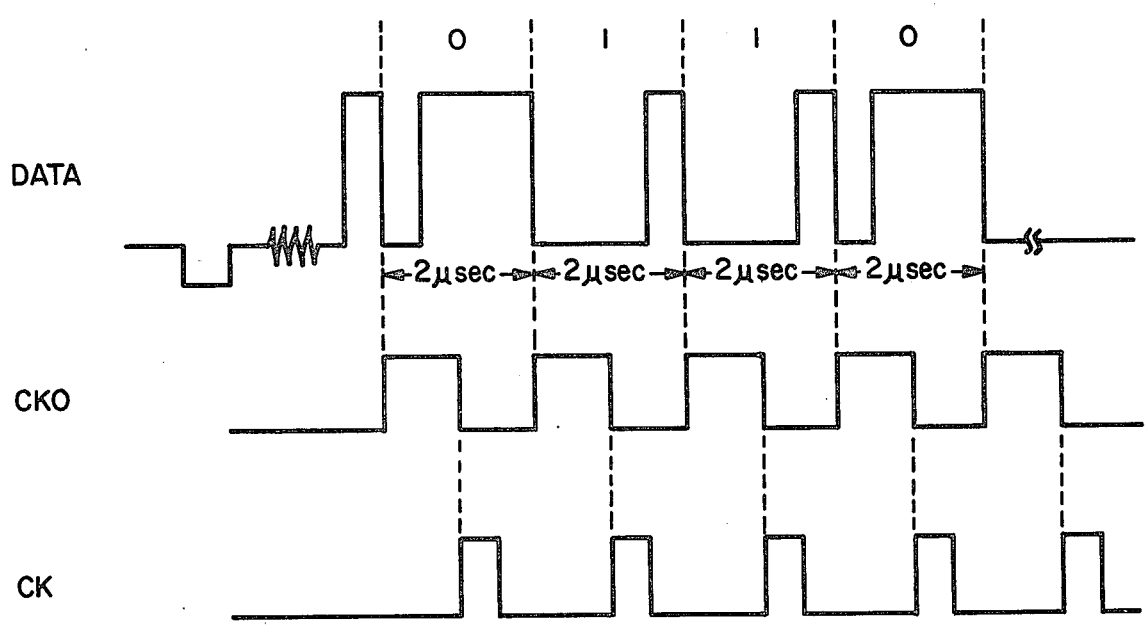
FIG. 4 is a timing chart illustrating various signal waveforms developed in the decoder of FIG. 3.

The subscriber and program data encoded in the composite baseband video signal is characterized by a self-clocking format as illustrated in FIG. 4. In this format each data bit has a duration of approximately 2 microseconds with a logic 1 state being represented by a relatively wide negative-going pulse followed by a narrow positive-going pulse and a logic 0 state being represented by a narrow negative-going pulse followed by a wide positive-going pulse. The encoded data is processed by timing circuit 52 for developing a clock signal CK, clock signal CK being formed by initially deriving a signal CKO which comprises a plurality positive-going pulses each having a duration of about one microsecond and being developed in response to the leading edge of a respective data bit. Clock signal CK comprises a stream of relatively narrow positive-going pulses each developed in response to a trailing edge of a respective CKO pulse. It will thus be observed that the repetition rate of clock signal CK corresponds to the data bit rate and that the leading or clocking edge of each pulse occurs approximately in the center of a respective data bit interval. Clock signal CK is therefore suitable for clocking shift registers 54, 56 and 60 for storing the encoded data developed at the outputs of data gates 46 and 48.

Clock signal CK is also used to clock a five stage bit counter 72. Bit counter 72 is adapted for dividing each encoded horizontal scanning line into twenty-six 2 microsecond data bit intervals which are used by a bit decoder 74 for deriving various timing signals for operating the remaining circuitry of the decoder. Table 1 lists each signal developed by decoder 74, its definition and the time of its occurence and duration in terms of data bit intervals during each encoded horizontal scanning line.

TABLE I

| Signal | Definition | Data Bit Intervals |
| --- | --- | --- |
| ADCF | Subscriber Address Code Frame | 1–20 |
| ATCF | Subscriber Authorization Code Frame | 21–25 |
| RSF | RAM Select COde Frame | 1–4 |
| PCF | Program Code Frame | 21–25 |
| EOL | End of Line | 26 |
| WRITE | RAM Write | 3 |

In operation, data gate 48 is responsive to the horizontal line 10-12 identification signal developed at the output of line decoder 70 and to the ADCF signal developed at the output of bit decoder 74 for gating each subscriber address code to one input of comparator 58. If the gated 20-bit subscriber address code matches the subscriber address code stored in register 30 an output signal is developed by comparator 58 setting a flip-flop 76. The logically high output of flip-flop 76 is then coupled for enabling an AND gate 78 for applying clock signal CK to the clock input of shift register 60. If a proper match is not detected by comparator 58 flip-flop 76 is maintained in a reset state whereby AND gate 78 is disabled inhibiting the application of clock signal CK to shift register 60. Therefore, shift register 60 is enabled for storing data supplied to its serial data input only in response to the detection of a match between the broadcast subscriber address code and the subscriber address code stored in register 30.

Assuming that a match has been detected by comparator 58 between the broadcast subscriber address code and the stored subscriber address code, shift register 60 is operated in response to clock signal CK for storing the 5-bit subscriber authorization code developed at the output of data gate 48 in response to the horizontal line 10-12 identification signal developed by line decoder 70 and the ATCF signal developed by bit decoder 74. During the subsequently occuring horizontal scanning line 13, the subscriber authorization code stored in shift register 60 is written into and stored at a memory location of RAM 44 in response to the development of a write signal by bit decoder 74, the particular memory location being determined by the 2-bit write RAM select code in accordance with the output of a decoder 80. Data gate 46 is responsive to the horizontal line 13 identification signal developed by line decoder 70 and the RSF signal developed by bit counter 74 for gating the write and read RAM select codes to the data input of 2-bit shift register 56. Clock signal CK is applied to the clock input of shift register 56 for initially causing the 2-bit write RAM select code to be stored, the stored write RAM select code being decoded by decoder 80 and coupled to the address inputs of RAM 44 for selecting the memory location at which it is desired to write the subscriber authorization code stored in shift register 60. The write signal developed by bit decoder 74 strobes the write input of RAM 44 immediately after the occurrence of the write RAM select code causing the subscriber authorization code stored in shift register 60 to be written into the selected memory location. Clock signal CK subsequently clocks the 2-bit read RAM select code into shift register 56 which is decoded by decoder 80 and coupled to the address inputs of RAM 44 for selecting the memory location from which it is desired to read a previously stored 5-bit subscriber authorization code for comparison to the current program code.

The current program code is gated by data gate 46 in response to the horizontal line 13 identification signal developed by line decoder 70 and the PCF signal developed by bit counter 74 and loaded in shift register 54 in response to the clock signal CK. The loaded program code is then applied to one input of a 5-bit comparator 82 which compares each bit of the program code with the corresponding bit of the subscriber authorization code stored in the addressed memory location of RAM 44. Each bit of the program code which is characterized by a logic 1 state indicates that the broadcast television signal belongs to the program category or tier represented by that bit position. Also, each logic 1 state bit of each 5-bit subscriber authorization code stored in RAM 44 indicates that the subscriber is authorized to decode television signals belonging to the program category or tier represented by the respective bit position. Therefore, if a match is detected between a logic 1 bit of the program code and the corresponding bit of the addressed subscriber authorization code, this indicates that the broadcast television signal belongs to a programming category which the subscriber is authorized to decode. Comparator 82 is strobed at the end of each horizontal line 13 by the output of an AND gate 84 for effecting the comparison and, if a match is detected, an output is developed by comparator 82 latching a latch circuit 86. Latch circuit 86, in turn, enables unscrambler 38 for unscrambling and decoding the broadcast television signal.

If a television signal belonging to a different programming category is broadcast at some later time the foregoing comparison is repeated using the new program code and new read RAM select code. If a match is again detected by comparator 82 between a logic 1 state bit of the new program code and the corresponding bit of the addressed subscriber authorization code stored in RAM 44, latch 86 is maintained in a latched condition for enabling unscrambler 38. However, if no match is detected, indicating that the subscriber is not authorized to decode the currently broadcast television signal, latch circuit 86 is reset disabling unscrambler 38.

What has thus been shown is an improved memory select system for a subscription television signal decoder. In accordance with the invention, a 20 tier subscription television system is provided even though 5-bit program and subscriber authorization codes are used. This is realized by employing a RAM having four 5-bit memory locations and using a 2-bit write RAM select code and a 2-bit read RAM select code to selectively write and read 5-bit subscriber authorization codes into and out of memory.

While there has been described a particular embodiment of the present invention, it will be apparent that changes and modifications may be made therein without departing from the invention in its broader aspects. The aim of the appended claims, therefore, is to cover all such changes and modifications as fall within the true spirit and scope of the invention.

We claim:

1. A subscription television system comprising:
 means for broadcasting a scrambled television signal having encoded in the vertical intervals thereof a p-bit program code and an m-bit memory read code together defining the programming category of said television signal and a p-bit subscriber authorization code and an m-bit memory write code together at least partially defining a subscriber's decode authorization status; and
 a decoder comprising
 means for receiving and converting said broadcast television signal to a corresponding baseband video signal;
 a memory having ($2^m$) individually addressable p-bit memory locations;
 means responsive to said baseband video signal for storing only a single p-bit subscriber authorization code at a selected p-bit memory location of said memory whose address is determined in accordance with said m-bit memory write code;
 means responsive to said baseband video signal for developing a decode authorization signal in response to the detection of a predetermined relationship between a received p-bit program code and the contents of a selected p-bit memory location of said memory whose address is determined in accordance with said m-bit memory read code; and
 means responsive to said decode authorization signal for unscrambling said baseband video signal.

2. A subscription television system according to claim 1 wherein said broadcast television signal has encoded in the vertical intervals thereof a plurality of said p-bit subscriber authorization codes each associated with a different subscriber address code identifying a respective system subscriber, said memory write code at least partially defining together with each of said subscriber authorization codes the decode authorization status of the respective system subscriber identified by the associated subscriber address code.

3. A subscription television system according to claim 2 including a plurality of said decoders each uniquely identified by a respective one of said subscriber address codes and each including means for enabling said means for storing in response to the detection of a condition of equality between one of said broadcast subscriber address codes and the subscriber address code identifying said decoder.

4. A subscription television system comprising:
 means for broadcasing a scrambled television signal having encoded in a selected vertical interval thereof
 (a) a p-bit program code and an m-bit memory read code together defining the programming category of said television signal;
 (b) a plurality of subscriber address codes each uniquely identifying a different system subscriber;
 (c) an m-bit memory write code;

(d) a plurality of p-bit subscriber authorization codes each associated with a respective one of said subscriber address codes and at least partially defining together with said m-bit memory write code the decode authorization status of the system subscriber identified by the associated subscriber address code; and a plurality of decoders each corresponding to a respective one of said subscriber address codes and each comprising (a) means for receiving and converting said broadcast television signal to a corresponding baseband video signal;

(b) a memory having ($2^m$) individually addressable p-bit memory locations;

(c) means responsive to said baseband video signal for storing only the single p-bit subscriber authorization code associated with a subscriber address code identifying a respective one of said decoders at a selected p-bit memory location of said memory whose address is determined in accordance with said m-bit write code;

(d) means responsive to said baseband video signal for developing a decode authorization signal in response to the detection of a predetermined relationship between said program code and the contents of a selected p-bit memory location of said memory whose address is determined in accordance with said m-bit read code; and (e) means responsive to said decode authorization signal for unscrambling said baseband video signal.

5. In a subscription television system having a plurality of decoders each including a memory having a plurality of individually addressable p-bit memory locations each adapted for storing a p-bit subscriber authorization code for comparison with a broadcast p-bit program code to determine the decode authorization status of the decoder, the improvement comprising:

means for broadcasting a selected memory write code and a selected memory read code;

means for updating the memory of said decoder by storing only a single broadcast p-bit subscriber authorization code in a selected p-bit memory location of said memory addressed by said broadcast memory write code; and means for determining the decode authorization status of said decoder by comparing the broadcast p-bit program code with a selected p-bit subscriber authorization code stored in the p-bit memory location of said memory addressed by by said broadcast memory read code.

6. A decoder for use in a subscription television system having means for broadcasting a scrambled television signal including encoded in the vertical intervals thereof a p-bit program code and an m-bit memory read code together defining the programming category of said television signal and a p-bit subscriber authorization code and an m-bit memory write code together at least partially defining a subscriber's decode authorization status, said decoder comprising:

means for receiving and converting said broadcast television signal to a corresponding baseband video signal;

a memory having ($2^m$) individually addressable p-bit memory locations;

means responsive to said baseband video signal for storing only a single p-bit subscriber authorization code at a selected p-bit memory location of said memory whose address is determined in accordance with said m-bit memory write code;

means responsive to said baseband video signal for developing a decode authorization signal in response to the detection of a predetermined relationship between said program code and the contents of a selected memory location of said memory whose address is determined in accordance with said m-bit memory read code; and means responsive to said decode authorization signal for unscrambling said baseband video signal.

7. A subscription television system decoder according to claim 6 wherein said broadcast television signal has encoded in the vertical intervals thereof a plurality of said p-bit subscriber authorization codes each associated with a different subscriber address code indentifying a respective system decoder, said memory write code at least partially defining together with each of said subscriber authorization codes the decode authorization status of the respective system decoder identified by the associated subscriber address code.

8. A subscription television system decoder according to claim 7 including means for enabling said means for storing in response to the detection of a condition of equality between one of said broadcast subscriber address codes and the subscriber address code identifying the respective system decoder.

9. A decoder for use in a subscription television system having means for broadcasing a scrambled television signal including encoded in a selected vertical interval thereof (a) a p-bit program code and an m-bit memory read code together defining the programming category of said television signal;

(b) a plurality of subscriber address codes each uniquely identifying a different system decoder;

(c) an m-bit memory write code;

(d) a plurality of p-bit subscriber authorization codes each associated with a respective one of said subscriber address codes and at least partially defining together with said m-bit memory write code the decode authorization status of the system decoder identified by the associated subscriber address code, said decoder comprising:

(a) means for receiving and converting said broadcast television signal to a corresponding baseband video signal;

(b) a memory having ($2^m$) individually addressable p-bit memory locations;

(c) means responsive to said baseband video signal for storing only the single p-bit subscriber authorization code associated with each subscriber address code identifying a respective one of said decoders at a selected p-bit memory location of said memory whose address is determined in accordance with said m-bit write code;

(d) means responsive to said baseband video signal for developing a decode authorization signal in response to the detection of a predetermined relationship between said program code and the contents of a selected p-bit memory location of said memory whose address is determined in accordance with said m-bit read code; and (e) means responsive to said decode authorization signal for unscrambling said baseband video signal.

10. In a subscription television system including means for broadcasting a selected memory write code and a selected memory read code and having a decoder including a memory having a plurality of individually addressable p-bit memory locations each adapted for storing a p-bit subscriber authorization code for comparison with a p-bit broadcast program code to determine the decode authorization status thereof, the improvement in said decoder comprising:

means for updating the memory of said decoder by storing only a single broadcast p-bit subscriber authorization code in a selected p-bit memory location of said memory addressed by said broadcast memory write code; and means for determining the decode authorization status of said decoder by comparing the broadcast p-bit program code with a selected p-bit subscriber authorization code stored in the p-bit memory location of said memory addressed by said broadcast memory read code.

11. In a subscription television system having a plurality of decoders each including a memory having a plurality of individually addressable p-bit memory locations each adapted for storing a p-bit subscriber authorization code for comparison with a broadcast p-bit program code to determine the decode authorization status of a subscriber, the improvement comprising:

broadcasting a selected memory write code and a selected memory read code;

updating said memory by storing only a single broadcast p-bit subscriber authorization code in a selected p-bit memory location of said memory addressed by said memory write code; and determining the decode authorization status of a subscriber by comparing the broadcast p-bit program code with a selected p-bit subscriber authorization code stored in a p-bit memory location of said memory addressed by said memory read code.

* * * * *